United States Patent [19]

Inoue et al.

[11] Patent Number: 4,683,261

[45] Date of Patent: Jul. 28, 1987

[54] ACRYLONITRILE POLYMER FILM AND PROCESS FOR PREPARING SAME

[75] Inventors: Akio Inoue; Tsuneaki Tanabe, both of Fuji, Japan

[73] Assignee: Asahi Kasei Kogyo Kabushiki Kaisha, Osaka, Japan

[21] Appl. No.: 859,111

[22] Filed: May 5, 1986

Related U.S. Application Data

[63] Continuation of Ser. No. 775,712, Sep. 13, 1985, abandoned, which is a continuation of Ser. No. 509,253, Jun. 29, 1983, abandoned.

[30] Foreign Application Priority Data

Jul. 5, 1982 [JP] Japan ............................. 57-116489
Jul. 8, 1982 [JP] Japan ............................. 57-119106

[51] Int. Cl.$^4$ ............................................. C08F 20/44
[52] U.S. Cl. ................................... 524/566; 526/341
[58] Field of Search ...................... 526/341; 524/566

[56] References Cited

U.S. PATENT DOCUMENTS

| | | | |
|---|---|---|---|
| 4,066,731 | 1/1978 | Hungerford | 264/290.2 X |
| 4,144,299 | 3/1979 | Inoue et al. | 264/233 X |
| 4,261,874 | 4/1981 | Hungerford | 524/566 |
| 4,388,258 | 6/1983 | Hungerford | 264/182 X |
| 4,403,055 | 9/1983 | Hungerford | 264/182 X |
| 4,432,917 | 2/1984 | Hungerford | 264/40.1 |
| 4,439,389 | 3/1984 | Hajenauer | 264/344 X |

*Primary Examiner*—Paul R. Michl

*Attorney, Agent, or Firm*—Sprung Horn Kramer & Woods

[57] ABSTRACT

An acrylonitrile polymer film comprising at least 85 wt. % of acrylonitrile, wherein the difference in the value of the second moment of the broad-line NMR spectrum at 20° C. between the film and the starting polymer powder thereof, or the polymer powder formed by dissolving the film and then precipitating the polymer from the solution, is at least 0.3 Gauss$^2$ and the infrared dichroic ratio of the nitrile groups satisfies the requirements that $0.4 < Ax/Az < 0.8$, $0.4 < Ay/Az < 0.8$, and $0.8 < Ax/Ay < 1.25$, where $Ax$ and $Ay$ are the absorption intensities of polarized infrared rays oscillating in respective directions parallel to the surface of the film and perpendicular to each other, and $Az$ is the absorption intensity of polarized infrared rays oscillating in the direction perpendicular to the film surface. This film is prepared by coagulating an acrylonitrile polymer solution in an aqueous coagulating bath, adjusting the water content of the obtained water-containing coagulated film to from 20 to 100 wt. % based on the weight of the dry polymer, longitudinally stretching the film using rolls having a surface temperature of 65° to 95° C., then transversely stretching the film at a water content of from 10 to 40 wt. % based on the weight of the dry polymer, which is lower than the water content at the longitudinally stretching step, in an atmosphere maintained at from 100° to 180° C. by using a tenter. The film has improved brittleness characteristics such as tensile elongation, folding endurance, and impact strength.

4 Claims, No Drawings

ACRYLONITRILE POLYMER FILM AND PROCESS FOR PREPARING SAME

This is a continuation of application Ser. No. 775,712, filed Sept. 13, 1985, abandoned, which is a continuation of application Ser. No. 509,253, filed June 29, 1983, now abandoned.

BACKGROUND OF THE INVENTION (1) Field of the Invention

This invention relates to an acrylonitrile polymer film and a process for the preparation thereof. More particularly, it relates to an acrylonitrile polymer film with highly reduced brittleness characteristics, namely, highly improved tensile elongation, folding endurance, and impact strength, and process for the preparation of this film.

(2) Description of the Prior Art

Films made of acrylonitrile polymers, especially polymers with a high nitrile content, have excellent gas barrier properties, weatherability, and stain resistance, but have inferior characteristics with regard to brittleness, such as tensile elongation, folding endurance, and impact strength. Moreover, since such polymers have poor thermoplasticity, the film should be prepared by a solvent shaping process using a solvent or a semi-melt shaping process using a plasticizer. However, the films obtained upon removing the solvent or plasticizer from the as-formed film have poor mechanical strengths, necessitating, orientation, and especially biaxial orientation.

Various methods for obtaining acrylonitrile polymer films having good mechanical strengths by biaxially stretching unoriented films of acrylonitrile polymer have already been proposed. However, when an acrylonitrile polymer film is oriented by stretching, fibrillation is readily caused, making biaxial stretching, and especially sequential biaxial stretching, difficult. As a typical instance of the methods which enable biaxial stretching of an acrylonitrile polymer film, there can be mentioned a method in which an unoriented film of an acrylonitrile polymer still containing a solvent, a plasticizer, or water is biaxially stretched. However, this method has drawbacks in connection with orientation and densification, making it impossible to obtain satisfactory improvements in the mechanical strength characteristics, and especially satisfactory reduction in the brittleness characteristics, of the film.

U.S. Pat. No. 3,437,717 discloses another method for biaxially stretching an unoriented acrylonitrile polymer film in the plasticized state, in which a solution of acrylonitrile polymer in a polar organic solvent is extruded in the form of a sheet and part of the solvent removed, following which the sheet biaxially stretched and the remainder of the solvent removed by drying with hot air. In this method, however, fluidization of molecules occurs, as a result of which sufficient orientation and densification are not attained.

U.S. Pat. No. 2,706,674 discloses a method in which an acrylonitrile polymer is placed in a semi-molten state by the hydration of the nitrile groups in the polymer at high temperature and pressure. This semi-molten acrylonitrile polymer is then extruded as a film through a slot die into an inert gas at room temperature. However, the film thus obtained has a large void ratio and an insufficiently high mechanical strength.

Japanese Examined Patent Publication No. 53-15,069 and U.S. Pat. No. 4,144,299 provides a method in which a solution of an acrylonitrile polymer is coagulated in an aqueous coagulating bath, and the film formed washed with water to remove the solvent, and the obtained undrawn water-containing film obtained biaxially stretched in the presence of water at a temperature of at least 100° C. by a tenter method or an inflation method. The film thus obtained is highly oriented, but still has poor tensile elongation, and other brittleness characteristics.

In addition, U.S. Pat. No. 4,066,731 discloses a method in which an undrawn film of acrylonitrile polymer is biaxially stretched in the presence of water in a wet atmosphere at a temperature not higher than 90° C. (200° F.), and preferably at a temperature not higher than 70° C. (160° F.), following which it is densified by drying. Even by this method, however, sufficient densification is difficult to attain, and the brittleness characteristics are not sufficiently reduced.

SUMMARY OF THE INVENTION

It is therefore a primary object of the present invention to provide a film of acrylonitrile polymer with reduced brittleness characteristics, namely, improved tensile elongation, folding endurance, and impact strength.

Another object of the present invention is to provide an industrially advantageous process for preparing a film of acrylonitrile polymer with reduced brittleness characteristics.

More specifically, in accordance with one aspect of the present invention, there is provided an acrylonitrile polymer film comprising at least 85% by weight of acrylonitrile, wherein the difference in the value of the second moment of the broad-line NMR spectrum at 20° C. between the film and the starting polymer powder used for the preparation thereof or the polymer powder formed by dissolving the film and then precipitating the polymer from the solution is at least 0.3 Gauss$^2$ and the infrared dichroic ratio of the nitrile groups satisfies the requirements that $0.4 < A_x/A_z < 0.8$, $0.4 < A_y/A_z < 0.8$ and $0.8 < A_x/A_y < 1.25$, in which $A_x$ and $A_y$ stand for the absorption intensities of polarized infrared rays oscillating in respective directions parallel to the surface of the film and perpendicular to each other, and $A_z$ stands for the absorption intensity of polarized infrared rays oscillating in the direction perpendicular to the surface of the film.

In accordance with another aspect of the present invention, there is provided a process for the preparation of acrylonitrile polymer films, which comprises coagulating a solution of acrylonitrile polymer in an aqueous coagulating bath, adjusting the water content of the coagulated water-containing film obtained to from 20 to 100% by weight, based on the weight of the dry polymer, stretching the film in the longitudinal direction by using rolls having a surface temperature of 65° to 95° C., then stretching the film in the transverse direction at a water content of from 10 to 40% by weight, based on the weight of the dry polymer, which is lower than the water content in the longitudinal stretching step, in an atmosphere maintained at from 100° to 180° C. by using a tenter.

DESCRIPTION OF THE PREFERRED EMBODIMENTS

The acrylonitrile polymer used in the present invention is a homopolymer of acrylonitrile or an acrylonitrile copolymer containing at least 85% by weight of acrylonitrile, As the comonomer to be copolymerized with acrylonitrile, there can be mentioned acrylic acid esters such as methyl acrylate, ethyl acrylate, propyl acrylate, butyl acrylate, amyl acrylate, hexyl acrylate, phenyl acrylate and octyl acrylate; methacrylic acid esters such as methyl methacrylate, ethyl methacrylate, propyl methacrylate, butyl methacrylate, amyl methacrylate, hexyl methacrylate, phenyl methacrylate and octyl methacrylate; vinyl halides and vinylidene halides such as vinyl chloride, vinyl bromide, vinyl fluoride, vinylidene chloride and vinylidene fluoride; vinyl amides such as acrylamide, methacrylamide, N-methylacrylamide and N-methylacrylamide and N-vinylpyrrolidone; vinyl esters such as vinyl acetate, vinyl propionate and vinyl butyrate; vinyl aromatic compounds such as styrene, vinylnaphthalene and vinylpyridine; vinyl carboxylic acids such as acrylic acid and methacrylic acid; unsaturated dicarboxylic acids such as itaconic acid, maleic acid and fumaric acid; unsaturated dicarboxylic anhydrides such as itaconic anhydrides and maleic anhydride; allylsulfonic acid, methallylsulfonic acid, and their salts; methacrylonitrile; and olefins such as ethylene and propylene. Copolymers comprising acrylonitrile and at least two of the foregoing comonomers may be used. Blends of two or more of the foregoing polymers may also be used.

If the acrylonitrile content of the acrylonitrile copolymer is lower than 85% by weight, the plasticizing effect of water is reduced, making the stretching operation difficult, although the extent of the plasticizing effect reduction varies depending upon the particular comonomer. In addition, the properties required for acrylonitrile polymer films, such as the gas barrier properties and weatherability, are insufficient.

The second moment of the broad-line NMR spectrum is determined by using a JNM-PW60 (60 MHz) NMR spectrometer supplied by Nippon Denshi K.K. The second moment is a quantity useful for estimating the structure of the film, especially the packing state of the film molecules. In the case of acrylonitrile polymer films, the second moment is thought to vary with the crystallinity of the polymer and the void ratio in amorphous parts of the film.

The second moment of the film is larger, indicating that the mechanical strength of the film if higher. In order to attain the intended reduction in brittleness, it is essential that the difference in the value of the second moment between the film and the starting polymer powder used for the preparation thereof of the polymer powder formed by dissolving the film and then precipitating the polymer from the solution be at least 0.3 Gauss$^2$. A range in this difference of from 3.0 to 2.0 Gauss$^2$ is especially convenient.

The infrared dichroic spectrum is determined by using a JIR 40X spectrometer supplied by Nippon Denshi K.K. according to the method disclosed in Die Makromolekulare Chemie, Vol. 176, 2451–2458 (1975).

The acrylonitrile polymer is oriented by stretching, and the infrared dichroic ratio (Ax/Az or Ay/Az) of the nitrile group $\mu$CN absorption at 2245 cm$^{-1}$ and the methylene group CH$_2$ absorption at 1455 cm$^{-1}$ decreases with an increase in the degree of stretching, i.e. orientation. The infrared dichroic ratio of the absorption of the nitrile group at 2245 cm$^{-1}$ varies greatly depending upon the degree of orientation; with stretching, the nitrile groups are oriented on the surface of the film in a direction perpendicular to the stretching direction. Ordinarily, the mechanical strength of the acrylonitrile polymer film increases with an increase in the degree of orientation, but the brittleness characteristics such as tensile elongation, impact strength, and folding endurance are insufficient either when orientation in both the longitudinal and transverse direction is too strong or when orientation in the longitudinal and transverse directions is unbalanced. Orientation in botn the longitudinal and transverse direction should therefore lie within specific ranges. More precisely, in the present invention, the infrared dichroic ratio of the nitrile groups must satisfy the conditions that $0.4 < Ax/Az < 0.8$, $0.4 < Ay/Az < 0.8$, and $0.8 < Ax/Ay < 1.25$, where Ax and Ay stand for the absorption intensities of polarized infrared rays oscillating in respective directions parallel to the surface of the film and perpendicular to each other, and Az stands for the absorption intensity of polarized infrared rays oscillating in the direction perpendicular to the surface of the film.

As is apparent from the foregoing illustration, the mechanical strengths, and especially brittleness, of the acrylonitrile polymer film is closely related to the second moment of the broad-line NMR spectrum and the infrared dichroic ratio. Acrylonitrile polymer films satisfying the above-mentioned requirements for both factors exhibit improved brittleness characteristics.

The above-mentioned structure is thermally stable, and the brittleness characteristics are especially highly reduced in acrylonitrile polymer films in which the change in the second moment of the broad-line NMR spectrum caused by carrying out hot air heat treatment at 140° C. for 1 minute is less than 0.5 Gauss$^2$.

The acrylonitrile polymer film of the present invention not only has highly improved mechanical strengths and reduced brittleness, but also the good gas barrier properties, weatherability, and stain resistance inherent in ordinary acrylonitrile polymer film.

The film of the present invention has excellent gas-barrier properties even in the wet state. Therefore, it is very useful as a packaging material for water-containing substances or foods to be boiled or retorted. Furthermore, because of its utilizing excellent weatherability and stain resistance, the film of the present invention is very valuable as a laminate on steel plates, plywood, or resin plates.

The film of the present invention is prepared, for example, by the process described below.

A solution of an acrylonitrile polymer is coagulated in an aqueous coagulating bath. The water content of the coagulated water-containing undrawn film obtained (hereinafter referred to as "water-containing starting film") is adjusted to from 20 to 100% by weight based on the weight of the dry polymer, preferably by hot air drying and/or hot water immersion. Next, the film is stretched in the longitudinal direction using rolls having a surface temperature of from 65° to 95° C., following which it is stretched in the transverse direction at a water content of from 10 to 40% by weight, based on the weight of the dry polymer, which is lower than the water content in the longitudinal stretching step, in an atmosphere maintained at from 100° to 180° C. by using a tenter.

The water-containing starting film of the acrylonitrile polymer is ordinarily prepared by a wet coagulation method using an aqueous coagulating bath. More specifically, a solution of acrylonitrile polymer is cast on the surface of a belt or drum, or extruded in the form of a sheet or tube through a slot die, and the extrudate coagulated in an aqueous coagulating bath to obtain a film. A conventional process for casting or extruding the acrylonitrile polymer solution may be used.

The solvent used to form the polymer solution may be, for example, dimethylformamide, dimethylsulfoxide, N-dimethylformamide, N-methyl-$\beta$-cyanoethylformamide, $\alpha$-cyanoacetamide, acetonitrile, $\gamma$-butyrolactone, ethylene carbonate, propylene carbonate, or an aqueous solution of an inorganic acid and its salts, such as nitric acid, sulfuric acid, zinc chloride or sodium thiocyanate.

The polymer concentration in the polymer solution is ordinarily higher than 10% by weight but lower than 50% by weight, and preferably in the range of from 10 to 35% by weight. As the polymer concentration becomes higher, the density of the stretched film increases, but at excessively high polymer concentrations, the viscosity of the solution becomes very large, making the solution difficult to deaerate and filtrate.

Water or an aqueous solution of the solvent used for formation of the polymer solution (for example, dimethylformamide or nitric acid) may be advantageously used as the aqueous coagulation bath for effecting coagulation. In order to obtain a high-density stretched film, the solvent concentration in the aqueous solution should be made as high as possible, yet not so high as to prevent coagulation from occurring. Ordinarily, this concentration may be higher when organic solvents are used than from occuring when inorganic solvents are used. For example, it is preferred that the concentration be from 20 to 40% by weight in the case of nitric acid, and from 30 to 60% by weight in the case of dimethylformamide. When the polymer concentration of the polymer solution is high, a dense film can be obtained even if the solvent concentration in the coagulating solution is low.

The solvent contained in the coagulated film may be removed by washing with cold or warm water. A low degree of solvent removal is desirable in view of the plasticizing effect of the residual solvent, but sufficient solvent should be removed to obtain the desired properties in the film. The water-containing starting film thus obtained ordinarily has a water content of from 50 to 400% by weight based on the weight of the dry polymer.

Furthermore, the water-containing acrylonitrile polymer starting film of the present invention may be prepared by one of the processes described below.

As described in U.S. Pat. No. 3,437,717, an acrylonitrile polymer is cast into a film using a volatile organic solvent, following with the solvent is volatilized to some extent by hot air, and the residual solvent removed by replacement with water or hot water. Moreover, a process may be adopted in which, as described in U.S. Pat. No. 2,706,674, the nitrile groups of an acrylonitrile polymer are hydrated with water to melt the polymer, and the polymer in the semi-molten state extruded into a water vapor atmosphere at high temperature and pressure. When this process is used, a small amount of a plasticizer should preferably be added.

The water content of the water-containing starting film thus prepared is adjusted to within the predetermined range, and the film then stretched. If the water content of the film and the temperature are adjusted to within the respective predetermined ranges, this ensures the stable preparation of a dense and transparent film with excellent uniformity of thickness and orientation.

The water content of the water-containing coagulated acrylonitrile polymer film thus formed is adjusted to from 20 to 100% by weight based on the weight of the dry polymer.

Adjustment of the water content in the water-containing starting film can be accomplished by a drying method using hot air, infrared rays, far infrared rays, steam, a hot plate, or hot rolls. However, rapid drying tends to result in devitrification or the formation of pores in the starting film, and hence, rapid drying should be avoided. Hot air drying is especially preferred because a stretched film with excellent transparency and mechanical strengths can be obtained, although the drying efficiency is low. Immersing the water-containing starting film in hot water maintained at 50° to 90° C. is very effective for performing dehydration and drying efficiently and uniformly. This method is especially effective for dehydration of starting films having a high water content. For example, when a starting film having a water content of about 250% by weight is immersed in hot water maintained at 80° C. for about 30 seconds, the film is uniformly dehydrated and dried to a water content of about 80% by weight. If the temperature of the hot water is higher than 90° C., considerable devitrification (the formation of pores) of the film by dehydration occurs, and it becames difficult to restore sufficient density to the film by subsequent heating. As a result, the physical properties, and especially the mechanical strength, of the film are reduced. If the temperature of the hot water is lower than 50° C., the drying effect by dehydration is lowered.

A standard roll-tenter sequential biaxial drawing apparatus is usually provided with a preheating zone formed upstream to a drawing zone of each the rolls and tenter. Adjustment of the water content and preliminary heating can be accomplished by utilizing this preheating zone.

The film having the water content adjusted in the above-mentioned manner is then subjected to a sequential stretching operation using rolls and a tenter. More specifically, the starting film with a water content adjusted to from 20 to 100% by weight based on the weight of the dry polymer is longitudinally stretched using rolls having a surface temperature of 65° to 95° C., following which the film is transversely stretched at a water content of from 10 to 40% by weight based on the weight of the dry polymer, which is lower than the water content in the longitudinally stretching step, in an atmosphere maintained at 100° to 180° C. by using a tenter.

If in the roll-stretching step, the water content of the starting film is lower than 20% by weight, it is difficult to maintain a water content at a level of at least 10% by weight in the subsequent tenter-stretching step. If the water content exceeds 80% by weight in the roll-stretching step, the formation of some pores is observed, but at a water content of up to 100% by weight, the film is densified and rendered transparent by the subsequent tenter-stretching operation. However, if the water content exceeds 100% by weight in the roll-stretching step, pores (devitrification) that cannot be removed in the subsequent tenter-stretching step are formed. Ordinarily, the water content of the starting film in the roll-stretching step is preferably from 15 to 70% by weight.

If the surface temperature of the rolls is lower than 65° C., the stretching stress is increased and the film readily broken during roll-stretching. If the surface temperature of the rolls is higher than 95° C., pores are formed (devitrification) by abrupt dehydration, and the film cannot be densified or rendered transparent during subsequent tenter-stretching. It is ordinarily preferred that the surface temoperature of the rolls lie in a range of from 70° to 90° C.

If the water content is lower than 10% by weight or the atmospheric temperature is lower than 100° C. in the tenter-stretching step, the stretching stress is increased and the film readily broken by stretching. If the water content exceeds 40% by weight in the tenter-stretching step, the stretching stress is increased and uniform stretching becomes difficult; and devitrification is casued to some extent in the stretched film and the mechanical strength is reduced. If the atmosphere temperature exceeds 180° C., uniform adjustment of the water content becomes difficult and necking readily caused. Ordinarily, it is preferred that the tenter-stretching operation be carried out at a water content of from 15 to 30% by weight and an atmospheric temperature of from 105° to 150° C. If the film contains a small amount (usually not more than 5%) of a plasticizer in addition to water, the tenterstretching operation can be carried out at a water content and an atmospheric temperature, which are slightly lower than the above-mentioned water content and atmospheric temperature.

If the acrylonitrile content of the polymer is close to 100%, i.e., if the copolymer has a composition close to that of an acrylonitrile homopolymer, the stretching stress is increased and uniform stretching becomes difficult. However, if a certain amount of plasticizer or solvent is incorporated in the undrawn film, the plasticizing effect of the water is enhanced and uniform stretching becomes possible. The upper limit of the acrylonitrile content of the polymer that allows uniform stretching without such auxiliary means is 98% by weight.

In order to obtain a film having high mechanical strength, it is preferred that the stretching ratio lie in a range of from 1.5 to 4, and more preferably 2.0 to 3.0, in either the longitudinal direction or the transverse direction. In order to obtain a film satisfying the requirements relating to the second moment of the broad-line NMR spectrum and the infrared dichroic ratio and having reduced brittleness characteristics according to present invention, it is preferred that the stretch ratio lie in a range of from 2.0 to 3.0, and the ratio of the stretching ratio in the longitudinal direction to the stretching ratio in the transverse direction (MD/TD; MD stands for the longitudinal direction and TD stands for the transverse direction) lie in a range of from 0.8 to 1.5.

In order to improve the thermal dimensional stability and the mechanical strength characteristics, heat setting treatment may be performed, if desired, after the stretching operation. Moreover, surface treatment may also be carried out to prevent the accumulation of static charges or improve the adhesiveness.

The present invention will now be described in detail with reference to the following examples that by no means limit the scope of the invention. Incidentally, in these examples, all percentages and parts are given by weight.

EXAMPLE 1

In 80 parts of an aqueous 70% nitric acid solution were dissolved 20 parts of a powdery acrylonitrile copolymer comprising 94% acrylonitrile and 6% methyl acrylate, and having a reduced viscosity of 1.4 as measured at 35° C. in dimethylformamide as the solvent at a polymer concentration of 0.2% and a second moment of 19.6 Gauss$^2$ in the broad-line NMR spectrum. The polymer solution was deaerated in vacuo and then extruded in to an aqueous 30% nitric acid solution maintained at 0° C. through a T-die having a slot width of 300 mm and a slot clearance of 2.0 mm while the resulting film was taken up at a rate of 2 m/min, to give a transparent coagulated film having a thickness of 350 μm. The film was washed in a coutercurrent-type water washing bath to remove the residual solvent (nitric acid), giving a water-containing starting film with a water content of 170%. The film was dried in a hot air oven maintained at 80° C. to adjust the water content. By using a roll-tenter biaxial drawing apparatus, the film was stretched in the longitudinal direction using metal rolls, then stretched in the transverse direction using a tenter to effect sequential biaxial stretching. The stretching ratio was 3.0 in the longitudinal direction and 2.5 in the transverse direction based on the original length of the starting film. The stretched film was heat-set by hot air maintained at 180° C. while maintaining the film at a constant length. The stretching conditions, stretchability, NMR second moment, infrared dichroic ratio, and physical properties of the stretched film are shown in Table 1.

TABLE 1

| | Roll-Stretching | | Tender-Stretching | | Stretching State | | Appearance | | NMR |
|---|---|---|---|---|---|---|---|---|---|
| Run No. | Water Content (%) | Temperature (°C.) | Water Content (%) | Temperature (°C.) | Roll-Stretching | Tenter-Stretching | Transparency (haze, %) | Thickness Uniformity | Second Moment (Gauss$^2$) |
| *1 1 | 50 | 80 | 25 | 130 | Good (transparent) | Good (transparent) | 1.0 | Good | 20.3 |
| 2 | 30 | 90 | 18 | 130 | Good (transparent) | Good (transparent) | 0.8 | Very good | 20.6 |
| 3 | 90 | 80 | 30 | 140 | Good (slight devitrification) | Good (transparent) | 1.2 | Very good | 20.4 |
| 4 | 50 | 80 | 8 | 130 | Good (slight devitrification) | Broken | * | Bad | — |
| 5 | 50 | 80 | 25 | 95 | Good (slight devitrification) | Broken | * | Bad | — |
| 6 | 50 | 100 | 20 | 130 | Good | Good | 2.8 | Good | 19.7 |

TABLE 1-continued

| | | | | | (devitrification) | (devitrification) | | | |
|---|---|---|---|---|---|---|---|---|---|
| 7 | 120 | 70 | 30 | 150 | Good (devitrification) | Good (devitrification) | 3.4 | Good | 19.5 |

| | | | | Physical Properties of Stretched Film | | | |
|---|---|---|---|---|---|---|---|
| Run No. | Infrared Dichroic Ratio | | | Tensile Strength ($kg/cm^2$) | Tensile Elongation (%) | Impact Strength (kg-cm) | Folding Endurance (10,000 times) |
| | Ax/Az | Ay/Ax | Ax/Ay | | | | |
| *1 | | | | | | | |
| 1 | 0.63 | 0.70 | 0.90 | 12.2 | 35 | 4.6 | 2.0< |
| | | | | 13.5 | 32 | | 2.0< |
| 2 | 0.58 | 0.64 | 0.90 | 14.0 | 30 | 5.0 | 2.0< |
| | | | | 14.4 | 28 | | 2.0< |
| 3 | 0.73 | 0.78 | 0.94 | 12.4 | 38 | 4.2 | 2.0< |
| | | | | 12.9 | 32 | | 2.0< |
| 4 | — | — | — | — | — | — | — |
| 5 | — | — | — | — | — | — | — |
| 6 | 0.82 | 0.82 | 1.00 | 11.2 | 25 | 2.6 | 0.6 |
| | | | | 12.5 | 22 | | 0.7 |
| 7 | 0.79 | 0.84 | 0.94 | 10.8 | 25 | 1.8 | 0.8 |
| | | | | 12.6 | 22 | | 1.2 |

*Transparency was not uniform and could not be measured.

Note
[1] Nos. 1 through 3 are runs according to the present invention, and Nos. 4 through 7 are comparative runs.
[2] For the tensile strength, tensile elongation and folding endurance, the upper value is the value as measured in the longitudinal direction (MD) and the lower value is the value as measured in the transverse direction (TD).
[3] The values of the tensile strength, tensile elongation and impact strength were determined according to the method in JIS Z-1707 (the falling ball test).
[4] The folding endurance values were determined according to the method in JIS P-8115.

COMPARATIVE EXAMPLE 1

The water-containing starting film obtained in Example 1 was subjected to simultaneous biaxial stretching at a water content of 25% and an atmospheric temperature of 130° C. by using a tenter type biaxial drawing apparatus. The stretching ratio was 3.0 in the longitudinal direction and 2.5 in the transverse direction. The stretched film was heat-set by hot air at 180° C. under a constant-length condition in the same manner as described in Example 1. The results for the films thus obtained are as follows.
Stretching state: good.
Appearance (haze, %): 0.8.
Thickness uniformity: good.
NMR second moment: 20.9 Gauss$^2$.
Infrared dichroism:
  Ax/Az of 0.62,
  Ay/Az of 0.60,
  Ax/Ay of 1.04.
Tensile strength:
  12.6 kg/mm$^2$ in MD, 12.3 kg/mm$^2$ in TD.
Tensile elongation: 13% in MD, 11% in TD.
Impact strength: 2.8 kg-cm.
Folding endurance:
  10,000 times in MD,
  7,000 times in TD.

EXAMPLE 2

In 70 parts of dimethylformamide were dissolved 30 parts of the same acrylonitrile copolymer as used in Example 1. The polymer solution was deaerated and then extruded in an aqueous 50% dimethylformamide solution through the same T-die as used in Example 1 to obtain a coagulated film having a thickness of 280 μm. The solvent was removed first by water washing in a countercurrent-type water washing bath, then by using warm water maintained at 60° C. to obtain a water-containing starting film having a residual dimethylformamide content of 3%. In the same manner as described in Example 1, the starting film was dried by hot air maintained at 120° C. to adjust the water content, and the film subjected first to roll-stretching then to tenter-stretching to effect sequential biaxial stretching. In the roll-stretching step, the water content of the starting film was 20% [sample (a)] or 40% [sample (b)] and the roll surface temperature was 80° C., while in the tenter-stretching step, the water content was 12% [sample (a)] or 30% [sample (b)] and the atmospheric temperature was 120° C. the stretching ratio was 3.0 in either the longitudinal direction or the transverse direction. A substantially uniform stretched film having a good transparency was obtained. The results data obtained for this film are as follows.

| | Sample (a) | Sample (b) |
|---|---|---|
| NMR second moment (Gauss$^2$) | 20.6 | 20.3 |
| Infrared dichroism | | |
| Ax/Ax | 0.58 | 0.67 |
| Ay/Az | 0.64 | 0.71 |
| Ax/Ay | 0.90 | 0.93 |

EXAMPLE 3

The water-containing starting film obtained in Example 1 was immersed for 60 seconds in hot water maintained at 40° to 95° C., dried by hot air maintained at 120° C. and then roll-stretched in the longitudinal direction at a roll surface temperature of 80° C., a water content of 40% in the starting film and a stretching ratio of 3.0. Then the film was stretched in the transverse direction at a water content of 15%, an atmospheric temperature of 130° C., and a stretching ratio of 2.5. The hot water treatment conditions and physical properties of the stretched film are shown in Table 2. The physical properties of the stretched film were determined after the film had been heat-set by hot air maintained at 180° C. while maintaining the film at a constant-length.

TABLE 2

| Run No. | Hot Water Immersion Treatment | | Physical Properties of Stretched Film | | | | | |
|---|---|---|---|---|---|---|---|---|
| | Temperature (°C.) | Water Content (%) in Starting Film after Treatment | Transparency (haze, %) | Thickness Uniformity | Tensile Strength (kg/mm$^2$) | | Tensile Elongation (%) | |
| | | | | | MD | TD | MD | TD |
| 1 | 40 | 175 | 0.9 | Good | 13.6 | 13.2 | 35 | 32 |
| 2 | 60 | 118 | 1.0 | Good | 12.8 | 13.1 | 31 | 26 |
| 3 | 80 | 90 | 1.2 | Good | 11.9 | 12.5 | 28 | 25 |
| 4 | 95 | 68 | 2.0 | Good | 9.8 | 10.2 | 18 | 13 |

In each of the stretched films shown in Table 2, the NMR second moment was 20.2 to 20.6 Gauss$^2$, and the infrared dichroic ratios Ax/Az and Ay/Az were 0.6 to 0.8.

EXAMPLE 4

Using a Henschel mixer, 60 parts of a powdery acrylonitrile polymer comprising 88% of acrylonitrile and 12% of vinyl acetate and having a broad-line NMR second moment of 18.3 Gauss$^2$ were homogeneously kneaded at 30° C. with 40 parts of ethylene carbonate to obtain flakes. The flakes were extruded in the form of a strand by a monoaxial screw extruder maintained at 150° C., then pelletized using a pelletizer. The pellets were extruded at 155° C. in the form of a sheet through a T-die by using a biaxial screw extruder to obtain a starting film having a thickness of 140 μm. The starting film was immersed in hot water maintained at 80° C. and the solvent removed to an ethylene carbonate content of 3%, giving an opaque film having a water content of 48%. The starting film was stretched in the longitudinal direction at a roll surface temperature of 80° C., a water content of 30% in the starting film, and a stretching ratio of 3.0 by using a roll-drawing apparatus provided with a preheating roll maintained at 60° C., following which the film was stretched in the transverse direction at an atmospheric temperature of 110° C., a water content of 16%, and a stretching ratio of 2.7 using a tenter-drawing apparatus. The stretched film was heat-set by hot air maintained at 180° C. while maintaining the film at a constant length to obtain a uniform and transparent film having the following physical properties.
NMR second moment: 19.4 Gauss$^2$.
Infrared dichroism:
  Ax/Az of 0.73,
  Ay/Az of 0.71,
  Ax/Ay of 1.03.
Transparency (haze, %): 2.2.
Tensile strength:
  16.6 kg/mm$^2$ in MD,
  15.6 kg/mm$^2$ in TD.
Tensile elongation: 32% in MD, 55% in TD.
Uniform thickness (R/x̄): 7%.
Impact strength: 5.4 kg-cm.
  We claim:

1. An acrylonitrile polymer film comprising at least 85% by weight of acrylonitrile and having a tensile elongation of 28% to 55% and an impact strength of 4.2 kg.cm to 5.4 kg.cm, wherein the difference in the value of the second moment of the broad-line NMR spectrum of 20% between the film and the starting polymer powder used for the preparation thereof, or the polymer powder formed by dissolving the film and then precipitating the polymer from the solution is from 0.3 to 2 Gauss$^2$ and the infrared dichroic ratio of the nitrile groups satisfies the requirements that $0.4<Ax/Az<0.8$, $0.4<Ay/Az<0.8$, and $0.8<Ax/Ay<1.25$, where Ax and Ay stand for the absorption intensities of polarized infrared rays oscillating in respective directions parallel to the surface of the film and perpendicular to each other, and Az stands for the absorption intensity of polarized infrared rays oscillating in the direction perpendicular to the surface of the film, produced by coagulating a solution of an acrylonitrile polymer in an aqueous coagulating bath, adjusting the water content of the obtained water-containing coagulated film to from 20 to 100% by weight based on the weight of the dry polymer, stretching the film in the longitudinal direction using rolls having a surface temperature of 65° to 95° C., then stretching the film in the transverse direction at a water content of from 10 to 40% by weight based on the weight of the dry polymer, which is lower than the water content in the longitudinal stretching step, in an atmosphere maintained at 100° to 180° C. by using a tenter.

2. An acrylonitrile polymer film as set forth in claim 1, wherein the change in the second moment of the broad-line NMR spectrum, which is caused by hot air treatment conducted at 140° C. for 1 minute, carried out after the film is biaxially stretched and dried, is less than 0.5 Gauss$^2$.

3. An acrylonitrile polymer film according to claim 1, wherein the adjustment of the water content of the water-containing coagulated film is carried out by hot air drying.

4. An acrylonitrile polymer film according to claim 1, wherein the adjustment of the water content of the water-containing coagulated film is carried out by dehydration by immersion in hot water maintained at 50° to 90° C., or by a combination of immersion in hot water maintained at 50° to 90° C., with hot air drying.

* * * * *

UNITED STATES PATENT AND TRADEMARK OFFICE
CERTIFICATE OF CORRECTION

PATENT NO. : 4,683,261
DATED : July 28, 1987
INVENTOR(S) : Akio Inoue, et al.

It is certified that error appears in the above-identified patent and that said Letters Patent is hereby corrected as shown below:

| | |
|---|---|
| Col. 2, line 2 | Delete "provides" and substitute --provide-- |
| Col. 3, line 52 | Delete "if" and substitute --is-- |
| Col. 3, line 56 | Delete "of" and substitute --or-- |
| Col. 3, line 59 | Delete "3.0" and substitute --0.3-- |
| Col. 4, line 12 and Col. 4, line 15 | Delete "direction" and substitute --directions-- |
| Col. 5, line 29 | Delete "coagulation" and substitute --coagulating-- |
| Col. 7, line 10 | Correct spelling of --temperature-- |
| Col. 12, line 17 | Delete "%" after "20" and substitute --°C.-- |
| Col. 12, line 44 | After "air" insert --heat-- |

Signed and Sealed this

Twenty-third Day of February, 1988

Attest:

DONALD J. QUIGG

*Attesting Officer*          *Commissioner of Patents and Trademarks*